United States Patent
Bouiller et al.

(10) Patent No.: US 7,372,175 B2
(45) Date of Patent: May 13, 2008

(54) TWO-SPOOL BYPASS TURBOJET WITH A REAR ELECTRICITY GENERATOR, AND AN AIR FLOW CONNECTION DEVICE AND SYSTEM

(75) Inventors: Philippe Bouiller, Samoreau (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 9 days.

(21) Appl. No.: 11/282,663

(22) Filed: Nov. 21, 2005

(65) Prior Publication Data
US 2006/0138779 A1    Jun. 29, 2006

(30) Foreign Application Priority Data
Nov. 25, 2004  (FR)  ................... 04 12505

(51) Int. Cl.
- F01D 15/10  (2006.01)
- F02C 6/00   (2006.01)
- H02K 7/18   (2006.01)
- H02K 9/00   (2006.01)

(52) U.S. Cl. ............... 290/52; 310/52; 310/88
(58) Field of Classification Search .................. 290/52, 290/1 R; 60/668; 310/88, 52, 60 R
See application file for complete search history.

(56) References Cited

U.S. PATENT DOCUMENTS

| | | | | |
|---|---|---|---|---|
| 2,971,334 A | * | 2/1961 | Carlson | 60/791 |
| 3,925,979 A | * | 12/1975 | Ziegler | 60/785 |
| 4,050,237 A | * | 9/1977 | Pall et al. | 60/39.08 |
| 4,490,622 A | * | 12/1984 | Osborn | 290/52 |
| 5,121,605 A | * | 6/1992 | Oda et al. | 60/608 |
| 5,285,123 A | * | 2/1994 | Kataoka et al. | 310/88 |
| 5,376,827 A | * | 12/1994 | Hines | 290/52 |
| 6,914,344 B2 | * | 7/2005 | Franchet et al. | 290/52 |
| 7,097,415 B2 | * | 8/2006 | Bart et al. | 415/69 |
| 2004/0183308 A1 | * | 9/2004 | Xu et al. | 290/52 |
| 2005/0121916 A1 | * | 6/2005 | Olsen et al. | 290/52 |
| 2006/0138888 A1 | * | 6/2006 | Bouiller et al. | 310/90 |
| 2006/0220388 A1 | * | 10/2006 | Teets et al. | 290/52 |

FOREIGN PATENT DOCUMENTS

FR    1589681    5/1970

* cited by examiner

Primary Examiner—Julio R. Gonzalez
(74) Attorney, Agent, or Firm—Oblon, Spivak, McClelland, Maier & Neustadt, P.C.

(57) ABSTRACT

A two-spool bypass turbojet includes a low-pressure spool having a rear portion carrying a low-pressure turbine provided with a low-pressure rotor. The turbojet includes a support structure connected to a casing and to a rear bearing in which the rotor is mounted. The bearing can be situated in an enclosure including a liquid lubricant feed. The enclosure can be put to atmospheric pressure via an air feed pipe connected to the enclosure via a link. The turbojet further includes an electricity generator connected to the rear end of the low-pressure rotor that extends downstream from the link, which link is secured to the rotor and includes a device for guiding the liquid lubricant from the feed to the bearing.

12 Claims, 4 Drawing Sheets

TWO-SPOOL BYPASS TURBOJET WITH A REAR ELECTRICITY GENERATOR, AND AN AIR FLOW CONNECTION DEVICE AND SYSTEM

The invention relates to a two-spool bypass turbojet comprising a low-pressure spool having, at its rear end, a low-pressure turbine provided with a low-pressure rotor, said turbojet including a support structure connected to a casing and to a rear bearing on which said rotor is mounted, said rear bearing being situated in an enclosure having means for feeding said bearing with liquid lubricant, said enclosure being put to atmospheric pressure by an air feed pipe coaxial with said rotor and connected to said enclosure via link means proving gas communication between said enclosure and said air feed pipe while guaranteeing sealing against liquid lubricant from said enclosure.

BACKGROUND OF THE INVENTION

In a conventional engine, the accessory box containing fuel pumps, bearing lubrication pumps, hydraulic pumps for controlling various members, electricity generators, and the starter, is placed outside the engine and receives power taken from the engine by means of a vertical shaft and angle takeoff, in particular connected to the rotor and in particular the low-pressure rotor.

Over the years, the increase in the compression ratios and the temperatures at the inlet to the turbine, and the improvements in materials and efficiency have led to a constant reduction in the size of engines so as to obtain a thrust/weight ratio that is ever greater, whether for civilian applications and for military applications.

The system for taking off power and the accessory box have had difficulty in following this progress correspondingly, and they thus represent a large fraction of the volume and the weight of an engine, particularly of a low thrust engine, i.e. an engine of small size, and particularly when the accessory box, which is generally placed under or on the engine, and sometimes to one side of it, carries an air starter and an electricity generator that are separate.

The use of small engines that are ever simpler and less expensive for the purpose of propelling training airplanes, observation or attack drones, and cruise missiles, is requiring engine manufacturers to make such engines more furtive. This can be attempted by greatly reducing their frontal surface area, thus also achieving a significant reduction in drag, thereby very significantly increasing the flying time or the range of aircraft or remote-controlled vehicles fitted with such engines. In order to reduce the weight and the frontal surface area of engines, it therefore appears desirable to envisage integrating an electric generator-starter in the engine and to eliminate the use of mechanical connections, so that the interface between the engine and the accessories then relies on electrical transmission.

In wide-bodied aircraft, having ever more numerous electrical or electrohydraulic flight controls, and also in radar, advanced warning, and electronic surveillance airplanes, electrical power requirements are large. The engines of such aircraft are fitted with booster or auxiliary generators, thereby increasing the size of the accessory boxes and also their weight for supporting them. In an engine having a large bypass ratio, it is therefore advantageous to integrate an auxiliary generator, and more generally a generator-starter in the engine, in order to reduce the size and the weight of angle takeoffs, or indeed to eliminate them, and to obtain a thinner cowl, with some of the electrically-driven accessories being housed in the pylon.

OBJECT AND SUMMARY OF THE INVENTION

The object of the present invention is to make it possible to integrate in a turbojet of the above-specified type an integrated electricity generator disposed coaxially about the axis of the turbomachine, in particular in the vicinity of the rear bearing.

To this end, the turbojet of the present invention further comprises an electricity generator coaxial with said spool and situated outside said enclosure, said generator being disposed and being connected to the rear end of said low-pressure rotor which extends downstream from said link means, said link means being secured to said rotor and including guide means for guiding the liquid lubricant between said feed means and said bearing.

In this way, it can be understood that by the presence of the link means, in spite of the rear end of said low-pressure rotor being extended downstream from said link means as far as the electricity generator, said enclosure is put to atmospheric pressure and simultaneously the liquid lubricant is guided between said liquid lubricant feed means and said bearing.

This solution also presents the additional advantage of enabling the electricity generator to be placed outside an enclosure containing a liquid lubricant, i.e. an atmosphere in which it is troublesome to locate an electrical system without having recourse to multiple sealing systems.

In addition, the rear or downstream position of the electricity generator is an advantage for generator maintenance.

Overall, by means of the solution of the present invention, it is possible to add the electricity generation function for the purpose of driving the low-pressure rotor, in particular for emergency purposes and/or as a starter.

In other dispositions that are advantageous and preferred, and that can be taken singly or in combination:

said low-pressure turbine is also provided with a plurality of stages, and each stage of the low-pressure turbine presents a ring of stationary blades secured to said casing and a ring of moving blades extending radially from the periphery of a disk of said rotor;

said link means are annular, thus making to possible to increase the number of link zones between said enclosure and said air feed pipe and simultaneously to increase the area of the means for guiding the liquid lubricant between said feed means and said bearing;

said link means include at least one radial passage passing through said rotor and connected to said air feed pipe and to at least one radial-axis tube secured to said rotor and extending said passage in an outward direction: with the enclosure being put to atmospheric pressure via the inside of the tube in this configuration;

said guide means comprise a guide wall extending axially, at least the face of said guide wall that faces towards the axis of the turbojet being inclined radially outwards on going from said feed means towards said bearing: this guide wall forms a kind of "gutter" allowing the liquid lubricant to flow in directed manner;

said link means comprise at least one chimney presenting a duct coaxial with said tube that extends radially outwards from said guide wall;

said tube is a part that is separate from said chimney, said tube is mounted in said duct, and said guide wall is disposed at the radially-outer end of said duct, and thus of the chimney;

the radially-inner end of said chimney includes an axial extension directed downstream and provided with a radial rim facing outwards: this rim serving under the effect of centrifugal forces to direct the oil forming the liquid lubricant radially outwards;

the radially-inner end of said chimney includes a transverse extension extended radially by a radial wall extending to said guide wall and co-operating with said transverse extension, said chimney, and said guide wall to define an axial opening allowing the liquid lubricant to flow, in particular from upstream to downstream;

in a second embodiment, said rotor is fitted in front of said radial passage with a rearwardly-open cavity extending under the rear bearing, said cavity communicating with said rear bearing via a passage, and the front of said chimney and of said guide wall is disposed at the location of the opening of said cavity, the downstream end of said guide wall extending inside said cavity, preferably bearing against the inside face of the radially-outer wall of said cavity;

said electricity generator comprises a primary magnetic circuit constrained to rotate with said rotor and a secondary magnetic circuit secured to said casing, such a conventional arrangement being simple to implement; and said electricity generator is configured to operate as a starter of said turbojet.

The present invention also provides an air flow link device and an air flow link system formed by a radial assembly of such air flow link devices, serving to provide simultaneously:

gas communication between an annular enclosure and an axial air feed pipe, said enclosure housing a rear bearing between a rotor surrounding said air feed pipe and a casing support structure; and guidance of a liquid lubricant between feed means and said rear bearing.

The dispositions of the invention make it possible to envisage a turbojet of the above-specified type in which the accessories are driven by electric motors powered by the electricity generators of the invention, thereby eliminating mechanical links and angle takeoffs, reducing the weight of the engine, and making the cowl thinner for a high bypass ratio turbojet.

BRIEF DESCRIPTION OF THE DRAWINGS

Other characteristics and advantages of the invention appear on reading the following description made by way of example and with reference to the accompanying drawings, in which.

MORE DETAILED DESCRIPTION

Figure 1:
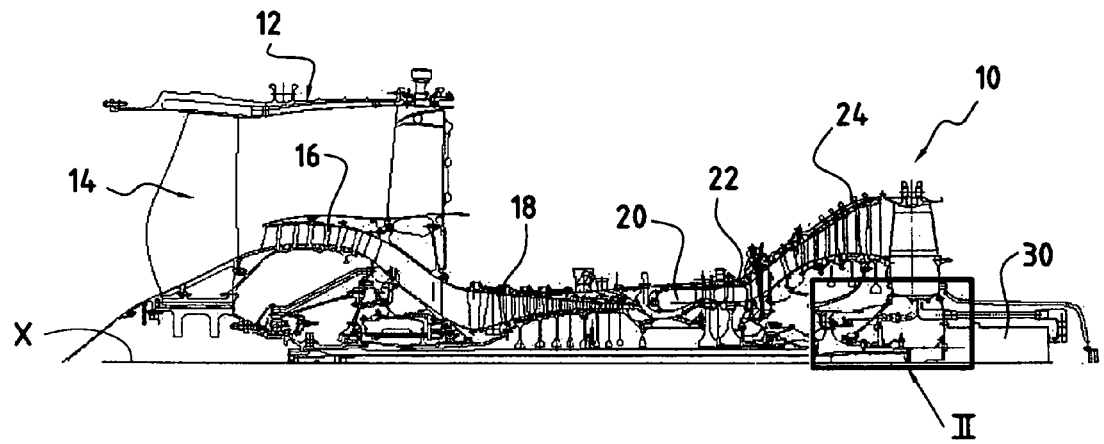
FIG. 1 is a diagrammatic half-section of a two-spool bypass turbojet showing the disposition of a generator integrated in its rear end in accordance with the invention.

FIG. 1 shows a two-spool bypass turbojet 10 having an electricity generator arranged in accordance with the invention at its rear end.

More precisely, the turbojet 10 of axis X conventionally comprises a peripheral cowl 12 (shown in part) having situated therein, from left to right in FIG. 1 (i.e. from upstream to downstream in the air flow direction, or from front to rear), in succession: the fan 14, a low-pressure compressor 16, a high-pressure compressor 18, a combustion chamber 20, a high-pressure turbine 22, and a low-pressure turbine 24.

Figure 2:
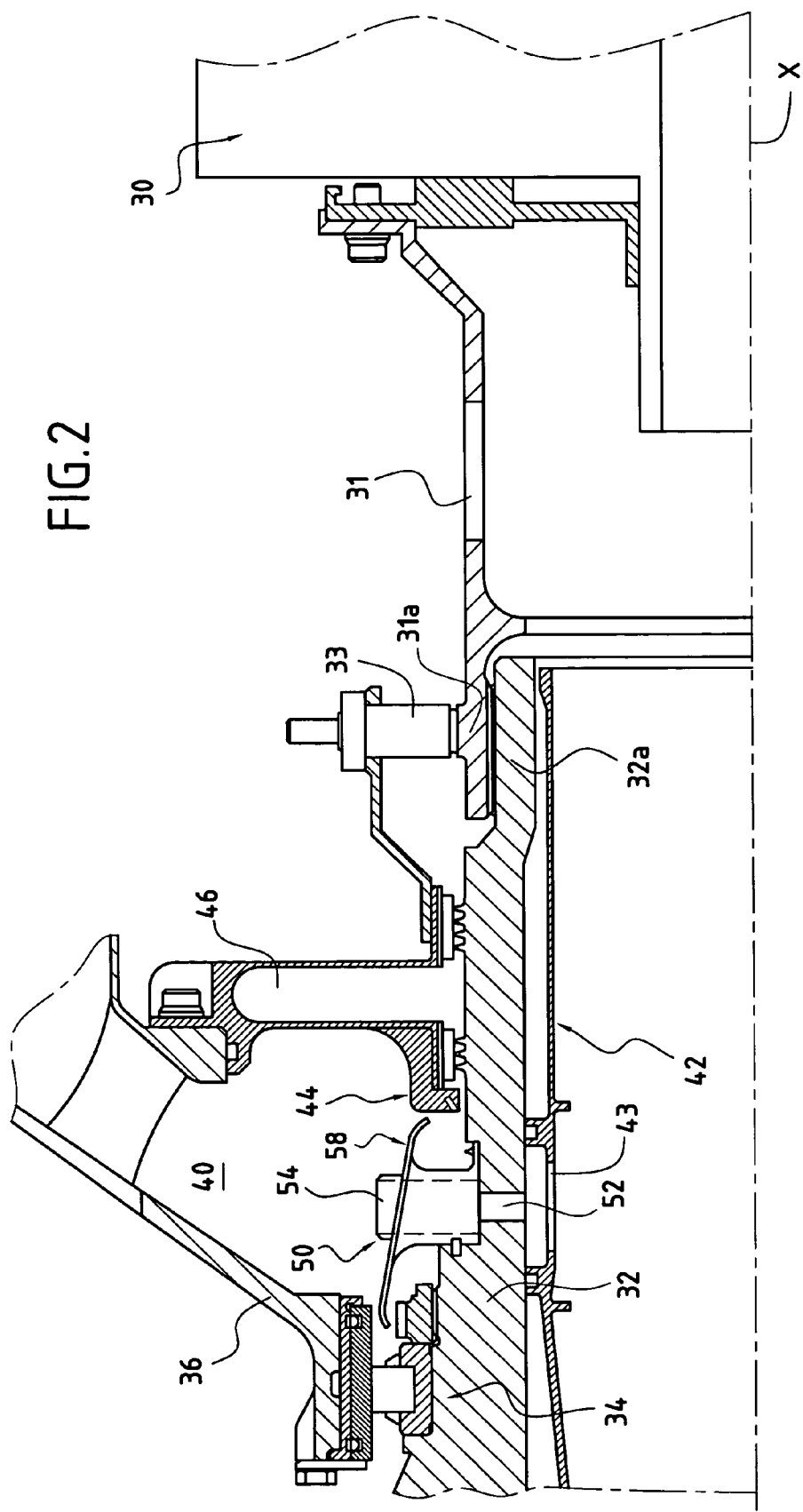
FIG. 2 is a fragmentary view on a larger scale of the detail II of FIG. 1 and shows the disposition of the generator of the invention on the rear end of the low-pressure rotor.

Finally, in the present invention, the turbojet 10 is fitted with an electricity generator 30 situated at the rear end of the turbojet 10 (to the right in FIGS. 1 and 2).

More precisely, and with reference to FIG. 2, it can be seen that the electricity generator 30 (and in particular its moving portion, not shown) is connected to the rear end 32a of the shaft 32 forming the low-pressure rotor that transmits energy from the low-pressure turbine 24 to the low-pressure compressor 16. FIG. 2 also shows the rear bearing 34 mounted on the shaft 32 from a support structure 36 extending integrally the rear portion of a casing (not shown) of the low-pressure turbine 24.

Figure 3:
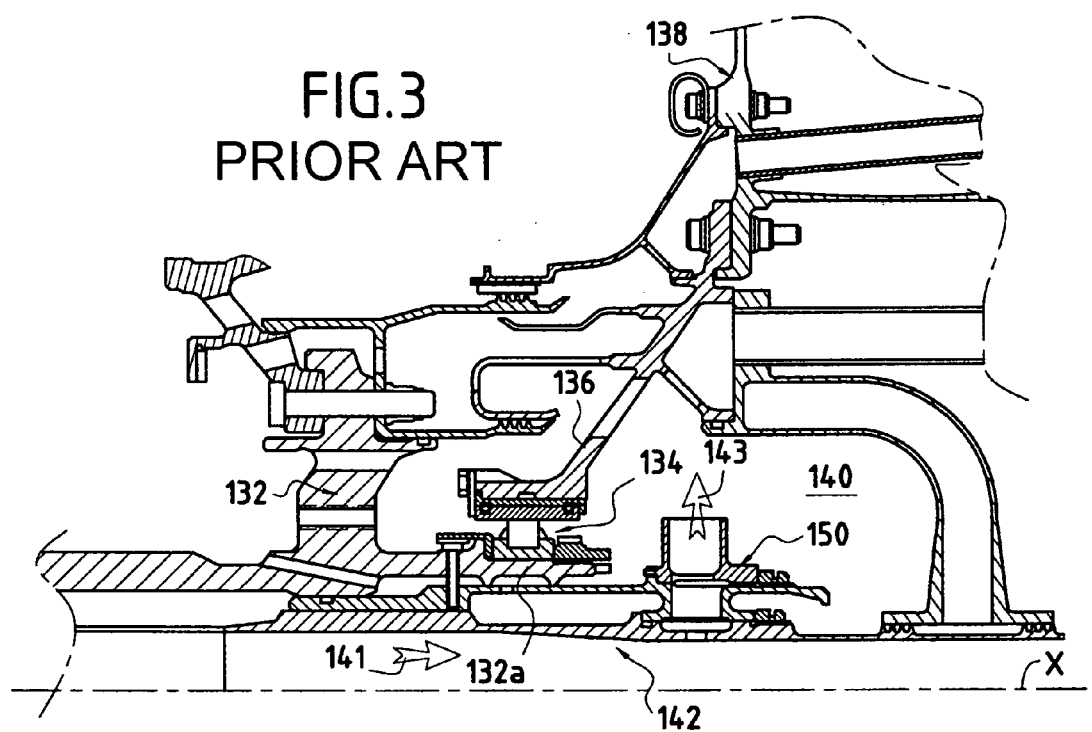
FIG. 3 is a view similar to FIG. 2, for a two-spool bypass turbojet of the prior art.

In order to better understand the present invention, reference is made to FIG. 3 showing the identical zones to that shown in FIG. 2, but for a prior art turbojet. In this case the low-pressure shaft 132 extends rearwards (to the right in FIG. 3) to an end 132a on which the rear bearing 134 is mounted, itself disposed on a support structure 136 assembled to a casing 138 of the low-pressure turbine.

The rear bearing 134 is located in an enclosure 140 that is lubricated by means of one or more nozzles (not shown) delivering a jet of oil towards the rear bearing 134. It will thus be understood that the atmosphere inside the enclosure 140 contains a fog of lubrication oil, such that the enclosure 140 must be kept sealed.

Furthermore, the low-pressure shaft 132 surrounds an air feed pipe 142 coaxially, said pipe constituting a central ventilation pipe about the axis X. Air at atmospheric pressure P0 flows along the air feed pipe 142 towards the enclosure 140 so as to place said enclosure likewise at atmospheric pressure P0 (see arrows 141 and 143).

To do this, the ventilation air coming from the air feed pipe 142 must penetrate into the enclosure 140 without the oil that is present in said enclosure 140 being able to penetrate into the air feed pipe 142.

These functions of passing air and preventing oil from flowing are performed by an annular set of chimneys 150 secured to the low-pressure shaft 132: under the effect of centrifugal force and because of the special shape of these chimneys, air from the air feed pipe 142 can penetrate into the enclosure 140 (arrows 141 and 143) without the oil present in said enclosure 140 being able to penetrate into the air feed pipe 142.

Starting from the arrangement shown in FIG. 3, when an electricity generator is to be placed at the rear end of the low-pressure shaft 132, it is necessary to extend the shaft rearwards (to the right in FIG. 3) so that the annular set of chimneys 150 allowing air to pass at atmospheric pressure P0 must be modified, but without that interfering with lubrication of the rear bearing 134.

It is in this context that the present invention has been developed in application of the solution presented in first and second preferred embodiments shown respectively in FIGS. 2 to 7 and in FIG. 8, which are described in greater detail below.

In FIG. 2, the low-pressure shaft 32 extends to its rear end 32a situated some distance behind (to the right in FIG. 2) the rear bearing 34. This rear end 32a is then connected to the moving portion of the electricity generator 30 via a cylindrical shroud 31 on which a sensor 33 is mounted to measure the speed of rotation of the low-pressure shaft 32, and also its operating conditions.

More precisely, the front end 31a of the cylindrical shroud 31 is fitted with fluting co-operating with the rear end 32a of the low-pressure shaft 32 to form a connection such that the cylindrical shroud 31 is constrained to rotate with the low-pressure shaft 32.

Between the rear bearing 34 and the rear end 32a of the low-pressure shaft 32, there is disposed at least one oil nozzle 44 together with an oil recovery system 46 placed at a pressure that is higher than atmospheric pressure.

From the above, it can thus be understood that it is necessary in the arrangement of the present invention, where an electricity generator 30 is present, to ensure that the enclosure 40 containing the bearing 34 is put at atmospheric pressure without interfering with lubricating the bearing.

To this end, annular link means are provided enabling gas communication between said enclosure 40 and the air feed pipe 42, and also serving as a guide for lubricating the rear bearing 34 from the nozzle 44.

A plurality of radial passages 52 pass through the rotor-forming low-pressure shaft 32, each radial passage 52 being in communication with the air feed pipe 42 via a corresponding hole 43 formed through the wall of the air feed pipe 42.

Air passes from each hole 43 towards the enclosure 40 via the annular link means.

These annular link means can be seen more clearly in FIGS. 4 to 7 showing the first embodiment in greater detail.

Figure 4:
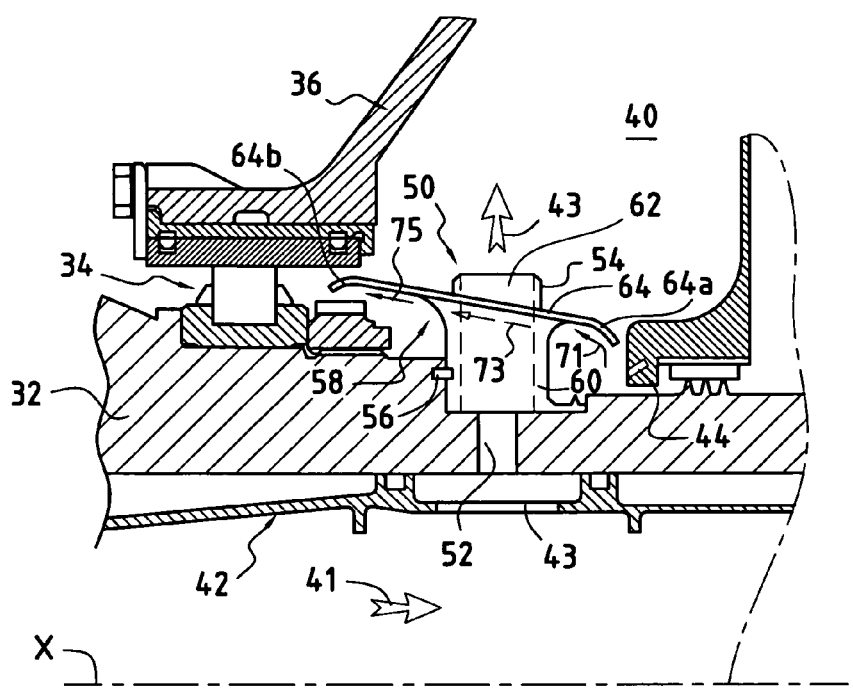
FIG. 4 is a view similar to FIG. 2 on a larger scale showing in greater detail the enclosure and a first embodiment of link means of the present invention, and in particular of means for guiding the liquid lubricant.
Figure 5:
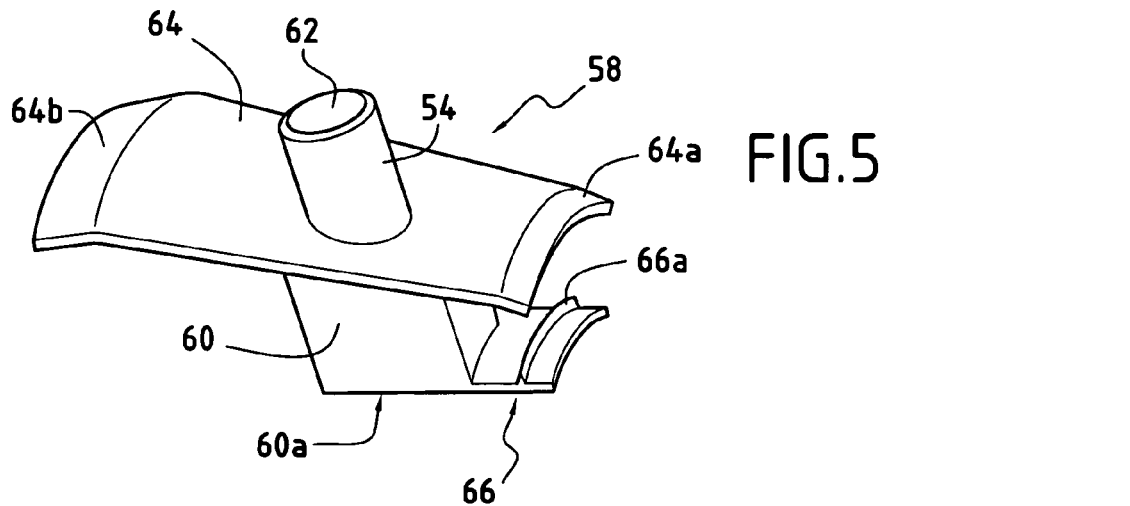
FIGS. 5 to 7 are different perspective views of the part forming a sector of the link means.
Figure 6:
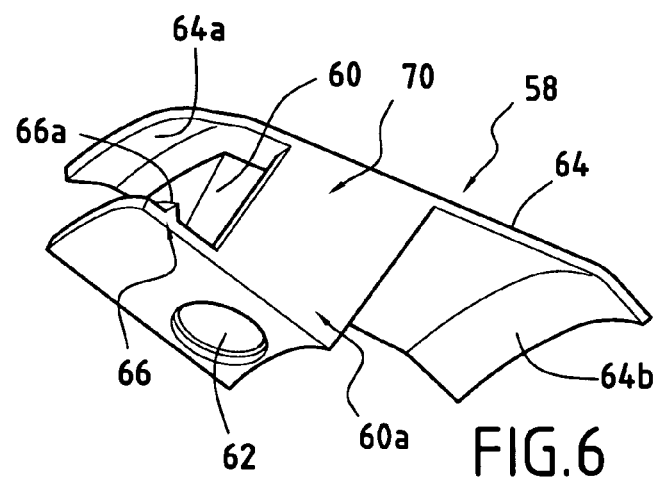
Figure 7:
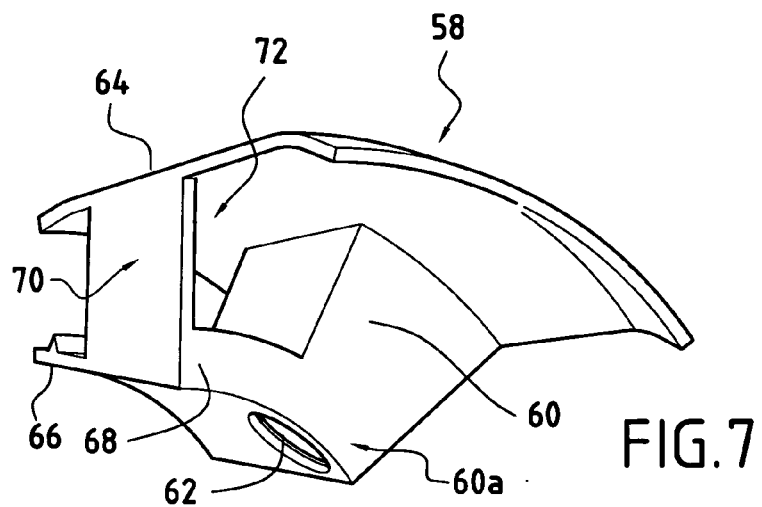

As can be seen in FIGS. 2 to 4 to 7, the annular link means 50 of the first embodiment comprise a plurality of parts 58 which together form a ring, in which a single angular sector is constituted by one of the parts 58 as shown in perspective in FIGS. 5 to 7.

More precisely, each part 58 comprises a chimney 60 extending radially and defining an internal duct 62.

In its radially-outer portion, the part 58 is extended from the radially-outer end of the chimney 60 by means of a guide wall 64 extending axially between a nozzle 44 and the bearing 34 (see FIG. 4).

This guide wall 64 is inclined radially outwards towards the bearing 34 which is radially further out than the nozzle 44: under the action of the centrifugal force generated by the low-pressure shaft 32 rotating, and to which the tube 54 and the part 58 are subjected, oil coming from the nozzle 44 "rises" along the face of the guide wall 64 that is facing towards the axis X (the bottom face of the guide wall 64) until it reaches the bearing 34 for the purpose of lubricating it.

This path is visible in FIG. 4, being represented by the successive positions of arrows 71, 73, and 75.

Thus, the guide wall 64 forms means for guiding the liquid lubricant between the feed means formed by one or more nozzles 44 and the rear bearing 34.

Provision is made for the upstream end 64a (at the rear or the right in FIG. 4) and the downstream end 64b (at the front or the left in FIG. 4) of the guide wall 64 to be inclined towards the axis X so as to form a deflector, thereby facilitating the circulation and the distribution of the lubrication oil. The terms "upstream" and "downstream" are used here relative to the flow direction of the lubrication oil.

The parts 58 present other arrangements for facilitating the flow of oil from upstream to downstream (from rear to front) between the angular sectors, and also from downstream to upstream (from front to rear) for the purpose of recovering oil.

Thus, the radially-inner end 60a of the chimney 60 is extended by a wall forming an axial extension 66 directed rearwards and having a face that faces radially outwards that is provided with an annular rim 66a making it easier to recover oil at the outlet from the nozzle 44, said oil being ejected radially outwards towards the guide wall 64 by the above-mentioned centrifugal forces.

Likewise, the wall extending the radially-inner end 60a of the chimney 60 forms a transverse extension 68 itself radially extended outwards by a radial wall 70 connected to the guide wall 64.

Thus, the chimney 60, the wall constituted by the transverse extension 68, the radial wall 70, and the guide wall 64 together define an axial opening 72 allowing oil to flow axially, in particular from upstream to downstream (from rear to front), but also from front to rear in order to recover lubrication oil.

Thus, the oil coming from the oil nozzle 44 is entrained, in particular by centrifugal force, towards the bottom face of the guide wall 64 level with et upstream end 64a (arrow 71 in FIG. 4). Thereafter, the oil advances along the bottom face of the guide wall 64 towards the bearing 34, passing successively through the axial opening 72 (arrow 73 in FIG. 4) and the downstream end 64b of the guide wall 64.

Oil flow between all of the angular sectors (each embodied by one of the parts 58) of the annular link means is made possible, in particular via the annular space defined by the bottom face of the guide wall 64, the wall of the chimney 60 facing towards the nozzle 44, and the axial extension 66.

The internal duct 62 of each part 58 serves to allow air to pass from the passage 52 into the enclosure 40. For this purpose, the radially-outer end of each chimney 60 is extended beyond the guide wall 64 by a ring-shaped tube 54.

It should be observed that the radially-inner end of the chimney 60 is secured to rotate with the low-pressure shaft 32 via at least one stud 56, such that all of the parts 58 are secured to one another and to the low-pressure shaft 32.

In this way, it will be understood that the part 58 forms an air flow link device comprising a radial chimney 60 for passing air that presents a duct 62 with an inlet close to the axis of rotation XX' and an outlet that is spaced apart from the axis of rotation, and a guide wall 64 for a liquid lubricant that extends axially around the chimney 60, being spaced apart from the inlet and the outlet of the duct 62, the face of the guide wall 64 that faces towards the inlet of the duct 62 sloping relative to the duct 62 so as to make it possible, by the centrifugal effect while the device is rotating about the axis, to direct the flow of liquid between an upstream end 64a and a downstream end 64b of the guide wall 64, with said device occupying an angular sector that is defined in a direction that extends transversely relative to the axial direction.

Advantageously, in this air flow link device, the radially-inner end of said chimney 60 includes an axial extension 66 directed downstream and provided with a radial rim 66a facing outwards and disposed, in the radial direction, facing the upstream end 64a of the guide wall 64: this serves to pick up the drops of oil that fall and thus accumulate along the outwardly directed axial rim, thus enabling the oil to be returned to the lubrication circuit via the bottom face of the guide wall 64.

Likewise, in this air flow link device, the radially-inner end of said chimney 60 includes a transverse extension 68 extended radially by a radial wall 70 extending to said guide wall 64 and co-operating with said transverse extension 68, said chimney 60 and said guide wall 64 to define an axial opening 72 allowing the liquid lubricant to flow.

It will be understood that together these air flow link devices or parts 58 are disposed in a ring around the axis of rotation (XX'), each of these devices forming an angular sector of the ring.

In this way, by means of such a set of air flow devices, an air flow link system is formed between an annular enclosure 40 and axial air feed pipe 42, said enclosure 40 housing a rear bearing 34 between a rotor 32 surrounding said air feed pipe 42 and a support structure 36 of a casing, said rotor 32 extending beyond the rear bearing 34 on either side of the rear bearing 34. This air flow link system provide gas communication said enclosure 40 and said air feed pipe 42 via said ducts 62 in each chimney 60 and via radial passages 52 passing through the rotor 32, and also guides the liquid lubricant between feed means 44 and said bearing 34 along the face of each guide wall 64 that faces towards the inlet of the corresponding duct 62. In an alternative (not shown) of this first embodiment, the part 58 comprises two separate portions: on one side a first part formed by the tube 54 that is received in the inner duct 62 of the chimney 60, and on the other side a second part formed by the chimney 60, the wall 66, 68, the radial wall 70, and the guide wall 64.

As can be understood from FIG. 4, in this alternative, the radial length of the part 58, and in particular of the chimney 60 is shorter than the radial length of the tube 54, such that the tube presents a radially-outer end that projects beyond the part 58, and in particular beyond the guide wall 64.

In addition, in this alternative, it should be observed that each second part formed by the chimney 60, the wall 66, 68, the radial wall 70, and the guide wall 64 is secured to the corresponding tube 54, e.g. by the stud 56 or by other connection means.

Figure 8:
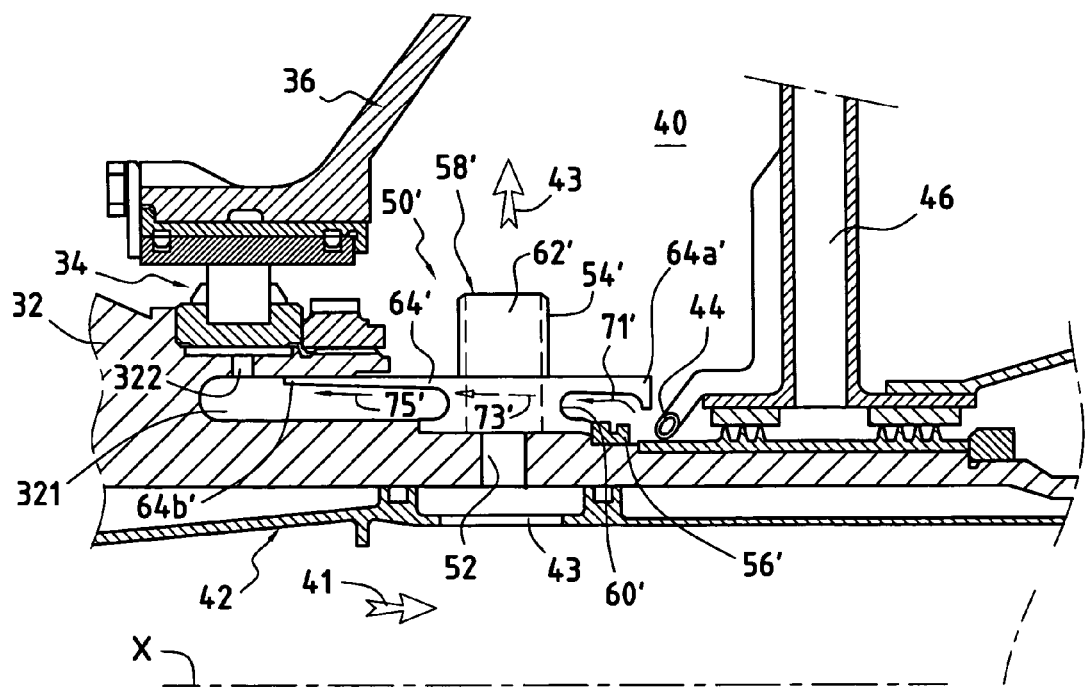
FIG. 8 is a view similar to FIG. 4 showing a second embodiment of the guide means.

Reference is now made to FIG. 8 showing the second embodiment in which the means for guiding the liquid lubricant between the feed means formed by one or more nozzles 44 and the rear bearing 34 are different.

In FIG. 8, elements that are identical to those of the first embodiment are given the same reference symbols.

In this second embodiment, the rotor 32 is fitted in front of said radial passage 52 (to the left in FIG. 8) with a cavity 321 that is rearwardly open (to the right in FIG. 8) and that extends forwards to immediately beneath the rear bearing 34.

This cavity 321 in the rotor 32 is annular around the axis X of the turbojet.

This cavity 321 of the rotor 32 communicates with the space situated under said rear bearing 34 via a radial passage 322 passing through the rotor wall situated between the rear bearing 34 and the cavity 321.

The annular link means 50' of the second embodiment also comprise a plurality of parts 58' each forming an angular sector of a ring.

Each part 58' comprises a chimney 60' having the radially-inner portion of a radial duct 62' passing therethrough, with the radially-outer portion of the duct passing through a tube 54'. The chimney 60' is shorter than the chimney 60 in the first embodiment since its radially-outer portion comes to a lower level than does the rear bearing 34 (measuring distance from the axis X), whereas the chimney 60 in the first embodiment comes to the same level as the rear bearing 34 relative to the axis X.

In this embodiment as in the first, the duct 62' communicates with radial passage 52 in the shaft 32, which passage is in communication with the air feed pipe 42 via the hole 43.

The chimney 60' is also fitted in its radially-outer portion with a guide wall 64'. In the second embodiment, the outer face of the guide wall 64' is plane and substantially parallel to the axis X, and the inner face (facing towards the axis X) of the guide wall 64 is inclined radially outwards going towards the rear bearing 34 so as to guide the oil.

In particular, the front of the chimney 60' and of said guide wall 64' is disposed at the location of the opening into said cavity 321.

More precisely, the downstream end 64b' of said guide wall 64' extends into the inside of said cavity 321, with the outer face of the downstream end 64b' pressing against the inner face of the rotor wall separating the cavity 321 from the rear bearing 34. In this way, the oil rises under centrifugal force from the nozzle along the inner face of the guide wall 64' (arrows 71', 73', and 75') as far as the downstream end 64b', and then between the guide wall 64' and the passage 322, the oil rises along the inner face of the rotor wall separating the cavity 321 from the rear bearing 34. Thereafter, the oil escapes via the passage 322 towards the rear bearing 34.

To this end, to ensure that the oil passes from the rear of the chimney 60' (to the right in FIG. 8) to the front of the chimney 60' (to the left in FIG. 8), the parts 58' are provided with respective axial openings (not shown) that can be similar to the axial opening 75 of the first embodiment.

The upstream end 64a' advantageously has a rim facing towards the axis X, making it easier to collect the oil coming from the nozzle 44.

To enable the parts 58' to be held relative to the shaft 32, the solution shown in FIG. 8 consists in using screws 56' as fastener means that are mounted in the shaft 32 of the rotor, behind the chimney which remains in abutment against the heads of the screws. The front portion (to the left in FIG. 8) of the chimney 60' is held by a shoulder on the shaft 32. These screws 56' can be replaced by an open annular ring or by studs as in the first embodiment.

In this second embodiment, the part 58' forms an air flow link device with a set of such devices forming an air flow link system in which said rotor 32 is fitted, in front of each radial passage 52, with a rearwardly-open cavity 321 extending under the rear bearing 34, said cavity 321 communicating with said rear bearing 34 via a passage 322. In addition, in front of said chimney 60' and said guide wall 64', there is located at the opening of said cavity 321, the downstream end 64b' of said guide wall 64' extending inside said cavity 321. As in the first embodiment, in a variant of the second embodiment, the part 58' may be made separately from the annular tube 54'.

The present invention also relates to a turbomachine including an air flow link system of the kind described above.

What is claimed is:

1. A two-spool bypass turbojet comprising a low-pressure spool having, at its rear end, a low-pressure turbine provided with a low-pressure rotor, said turbojet including a support structure connected to a casing and to a rear bearing on which said rotor is mounted, said rear bearing being situated in an enclosure having means for feeding said bearing with liquid lubricant, said enclosure being put to atmospheric pressure by an air feed pipe coaxial with said rotor and connected to said enclosure via link means enabling gas communication between said enclosure and said air feed pipe while guaranteeing sealing against liquid lubricant from said enclosure, the turbojet further comprising an electricity generator coaxial with said spool and situated outside said enclosure, said generator being disposed and being connected to the rear end of said low-pressure rotor which extends downstream from said link means, said link means being secured to said rotor and including guide means for guiding the liquid lubricant between said feed means and said bearing, wherein said guide means comprise a guide wall extending axially, at least the face of said guide wall that faces towards the axis of the turbojet being inclined radially outwards on going from said feed means towards said bearing.

2. A turbojet according to claim 1, wherein said link means are annular.

3. A turbojet according to claim 1, wherein said link means include at least one radial passage passing through said rotor and connected to said air feed pipe and to at least one radial-axis tube secured to said rotor and extending said passage in an outward direction.

4. A turbojet according to claim 1, wherein said electricity generator comprises a primary magnetic circuit constrained to rotate with said rotor and a secondary magnetic circuit secured to said casing.

5. A turbojet according to claim 1, wherein said electricity generator is configured to operate as a starter for said turbojet.

6. A turbojet according to claim 1, wherein said electricity generator is configured to power an accessory located outside said enclosure.

7. A turbojet according to claim 6, wherein said accessory is a pump.

8. A two-spool bypass turbojet comprising a low-pressure spool having, at its rear end, a low-pressure turbine provided with a low-pressure rotor, said turbojet including a support structure connected to a casing and to a rear bearing on which said rotor is mounted, said rear bearing being situated in an enclosure having means for feeding said bearing with liquid lubricant, said enclosure being put to atmospheric pressure by an air feed pipe coaxial with said rotor and connected to said enclosure via link means enabling gas communication between said enclosure and said air feed pipe while guaranteeing sealing against liquid lubricant from said enclosure, the turbojet further comprising an electricity generator coaxial with said spool and situated outside said enclosure, said generator being disposed and being connected to the rear end of said low-pressure rotor which extends downstream from said link means, said link means being secured to said rotor and including guide means for guiding the liquid lubricant between said feed means and said bearing, wherein said link means include at least one radial passage passing through said rotor and connected to said air feed pipe and to at least one radial-axis tube secured to said rotor and extending said passage in an outward direction, and wherein said guide means comprise a guide wall extending axially, at least the face of said guide wall that faces towards the axis of the turbojet being inclined radially outwards on going from said feed means towards said bearing, and wherein said link means comprise at least one chimney presenting a duct coaxial with said tube that extends radially outwards from said guide wall.

9. A turbojet according to claim 8, wherein said tube is a part that is separate from said chimney, wherein said tube is mounted in said duct, and wherein said guide wall is disposed at the radially-outer end of said duct.

10. A turbojet according to claim 8, wherein the radially-inner end of said chimney includes an axial extension directed downstream and provided with a radial rim facing outwards.

11. A turbojet according to claim 8, wherein the radially-inner end of said chimney includes a transverse extension extended radially by a radial wall extending to said guide wall and co-operating with said transverse extension, said chimney, and said guide wall to define an axial opening allowing the liquid lubricant to flow.

12. A turbojet according to claim 8, wherein said rotor is fitted in front of said radial passage with a rearwardly-open cavity extending under the rear bearing, said cavity communicating with said rear bearing via a passage, and wherein the front of said chimney and of said guide wall is disposed at the location of the opening of said cavity, the downstream end of said guide wall extending inside said cavity.

* * * * *